United States Patent
Meyer

(10) Patent No.: US 9,494,267 B2
(45) Date of Patent: Nov. 15, 2016

(54) NUT, SOCKET AND ADAPTER FOR A FLUID NOZZLE

(71) Applicant: Elaflex Hiby Tanktechnik GmbH & Co. KG, Hamburg (DE)

(72) Inventor: Heinz-Ulrich Meyer, Hamburg (DE)

(73) Assignee: ELAFLEX HIBY TANKTECHNICK GMBH & CO.

(*) Notice: Subject to any disclaimer, the term of this patent is extended or adjusted under 35 U.S.C. 154(b) by 40 days.

(21) Appl. No.: 14/504,897

(22) Filed: Oct. 2, 2014

(65) Prior Publication Data

US 2015/0091295 A1    Apr. 2, 2015

(30) Foreign Application Priority Data

Oct. 2, 2013 (EP) .................................. 13187120

(51) Int. Cl.
  *F16L 39/00* (2006.01)
  *F16L 33/22* (2006.01)
  (Continued)

(52) U.S. Cl.
  CPC ........... *F16L 33/226* (2013.01); *B67D 7/3281* (2013.01); *F16L 19/005* (2013.01);
  (Continued)

(58) Field of Classification Search
  CPC ....... F16L 39/00; F16L 39/005; F16L 39/02; F16L 19/005
  USPC ..................................................... 285/89, 92
  See application file for complete search history.

(56) References Cited

U.S. PATENT DOCUMENTS 3,895,832 A * 7/1975 Ellis .................. F16L 19/14
                                                    285/322
5,181,751 A * 1/1993 Kitamura .............. F16L 37/092
                                                    285/308

(Continued)

FOREIGN PATENT DOCUMENTS

EP    2620684    7/2013
EP    2857733    4/2015
(Continued)

OTHER PUBLICATIONS

European Search Report for 13187120.4 dated Feb. 25, 2014, 11 pages.
(Continued)

*Primary Examiner* — Rodney Mintz
*Assistant Examiner* — Daniel Kenny
(74) *Attorney, Agent, or Firm* — Casimir Jones, S.C.; Mary Ann Brow

(57) ABSTRACT

The invention relates to a nut (1) for arrangement on a hose connector, including a connecting device (2) which is connectable in a fluid-tight manner to a hose connection part (13), and a receiving means (3) for the hose connector (7), having a first end (3a) and a second end (3b), wherein the receiving means (3) is realized for the purpose of encompassing the hose connector (7) in a form-fitting manner in the circumferential direction in such a manner that the nut (1) and the hose connector (7) are rotatable in relation to one another in the circumferential direction; wherein the nut (1) comprises anti-rotation protection (4) which is realized such that, as a result of a structural element (16) of the hose connection part (13), it is transferable from an open position, in which the nut (1) and the hose connector (7) are rotatable in relation to one another in the circumferential direction when the nut is arranged on the hose connector, into a closed position in which rotating of the nut (1) in the circumferential direction in relation to the hose connector (7) is prevented when the nut (1) is arranged on the hose connector (7). The invention additionally relates to a hose connector for a fluid hose as well as to a hose connection part for a fluid hose.

19 Claims, 7 Drawing Sheets

Figure 1:
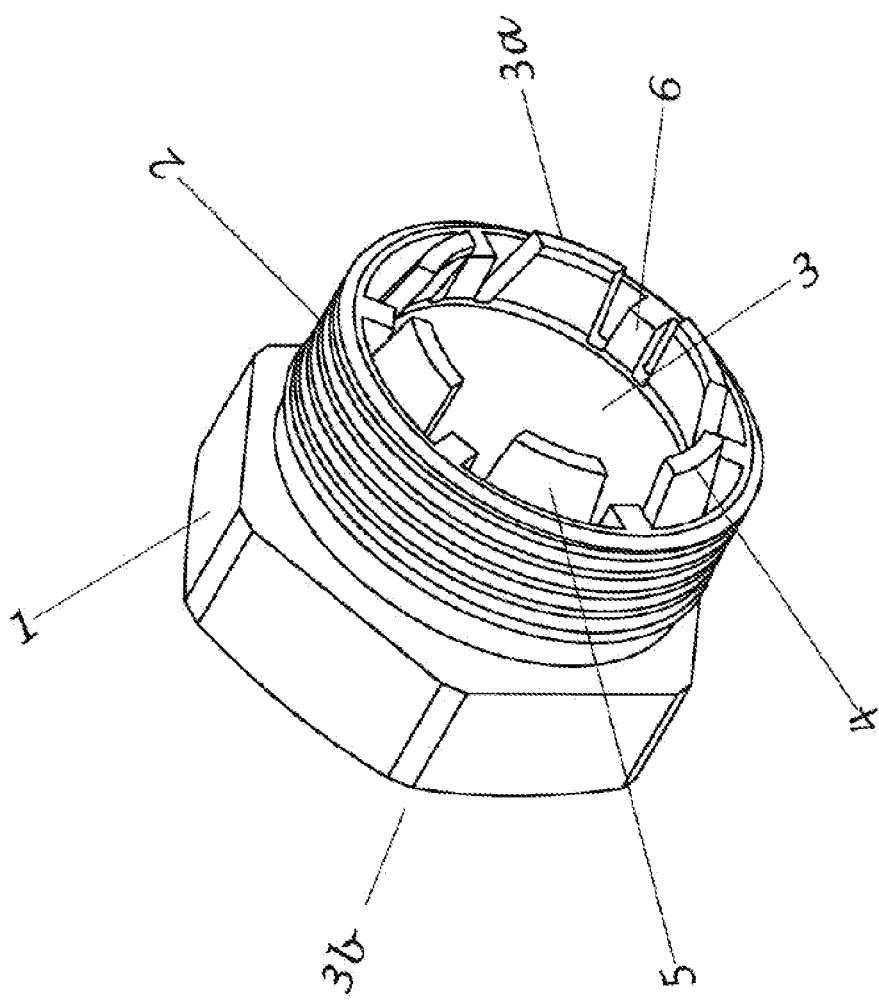

(51) Int. Cl.
*F16L 19/00* (2006.01)
*F16L 19/065* (2006.01)
*F16L 25/01* (2006.01)
*F16L 39/02* (2006.01)
*B67D 7/32* (2010.01)
*B67D 7/04* (2010.01)
*F16B 39/32* (2006.01)

(52) U.S. Cl.
CPC ............ *F16L19/0656* (2013.01); *F16L 25/01* (2013.01); *F16L 33/223* (2013.01); *F16L 39/02* (2013.01); *B67D 7/0478* (2013.01); *B67D 2210/00062* (2013.01); *F16B 39/32* (2013.01)

(56) References Cited

U.S. PATENT DOCUMENTS

| | | |
|---|---|---|
| 5,285,744 A | 2/1994 | Grantham et al. |
| 5,746,454 A | 5/1998 | Webb |
| 5,799,834 A | 9/1998 | Small et al. |
| 6,412,832 B1 | 7/2002 | Donoho et al. |
| 7,425,022 B2 * | 9/2008 | Guest .................. F16L 37/0925 285/322 |
| 8,371,341 B2 | 2/2013 | Gray |
| 2012/0001425 A1 | 1/2012 | Lee |

FOREIGN PATENT DOCUMENTS

| | | |
|---|---|---|
| GB | 2029538 | 3/1980 |
| WO | WO 89/10323 | 11/1989 |

OTHER PUBLICATIONS

English Abstract of EP 2857733 retrieved May 27, 2015, 1 page.

* cited by examiner

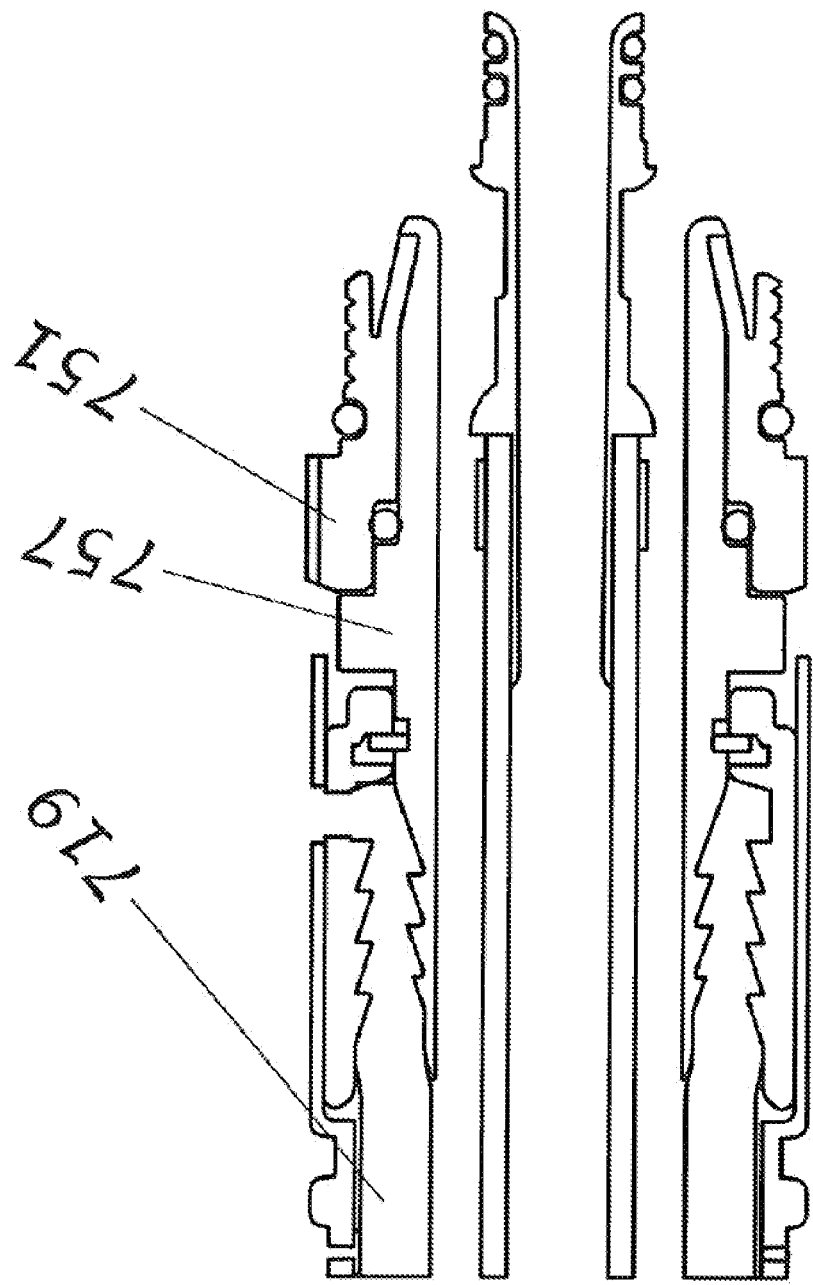

NUT, SOCKET AND ADAPTER FOR A FLUID NOZZLE

This application claims the benefit of European Patent Application 13187120.4, filed Oct. 2, 2013, which is incorporated herein by reference in its entirety.

The invention relates to a nut for arrangement on a hose connector according to the main preamble of Claim 1, to a hose connector for a fluid hose according to the preamble of Claim 8 and to a hose connection part for a fluid hose according to the preamble of Claim 11.

The invention lies in the area of hose connections. A typical hose connection part comprises an internal thread which can be connected in a liquid-tight manner to a corresponding external thread of a hose connector. Fuel pump connections, for example, which comprise a fixed internal thread or a rotatable metal nut with an internal thread, are known from general prior use. These latter can be connected in a liquid-tight manner to a hose connector with an external thread. A disadvantage of a fixed internal thread is that the pump hose, which as a rule comprises an intended curvature, cannot be aligned during assembly. The play of a rotatable nut with an internal thread, in contrast, does allow for alignment of the pump hose, not however for its fixing in the desired alignment.

Against said background, it is the object of the invention to provide means for connecting a hose which enable the hose to be aligned and fixed in a simple manner during assembly.

Said object is achieved by a nut of the type mentioned in the introduction with the features of Claim 1, a hose connector of the type mentioned in the introduction with the features of Claim 8 and a hose connection part of the type mentioned in the introduction with the features of Claim 11, which are matched to one another in each case such that they interact to solve the problem.

The nut according to the invention will be explained first of all.

A nut according to the invention for arrangement on a hose connector comprises a connecting device which is connectable in a fluid-tight manner to a hose connection part. In this connection, this can be any suitable connection device that is known in the prior art. It is preferred within the framework of the invention when the connecting device includes an external thread which is connectable in a fluid-tight manner to a corresponding internal thread of the hose connection part.

A nut according to the invention also comprises a receiving means for the hose connector, having a first end and a second end, the receiving means being realized for the purpose of encompassing the hose connector in a form-fitting manner in the circumferential direction in such a manner that the nut and the hose connector are rotatable in relation to one another in the circumferential direction. The terms circumferential direction, axial direction and radial direction relate within the framework of the invention to the geometry of the nut, the axial direction designating the direction parallel to the inside circumferential surface of the receiving means for the hose connector and transversely with respect to the circumferential direction.

The solution according to the invention provides that the nut comprises anti-rotation protection which is realized such that, as a result of a structural element of the hose connection part, it is transferable from an open position, in which the nut and the hose connector are rotatable in relation to one another in the circumferential direction when the nut is arranged on the hose connector, into a closed position in which rotating of the nut in the circumferential direction in relation to the hose connector is prevented when the nut is arranged on the hose connector.

Within the framework of the invention, the terms open position and closed position are not restricted to discrete states. Within the framework of the invention, the transition from the open position into the closed position can be flowing. The difference between the open position and the closed position can depend on a certain torque that is necessary to cause the nut to rotate in the circumferential direction in relation to the hose connector. In other words, within the framework of the invention, the term closed position also includes such embodiments of the invention where the nut rotating in the circumferential direction in relation to the hose connector is prevented below a certain torque threshold value which is preferably chosen such that in the normal use of the nut according to the invention, or of the hose connector according to the invention, the nut is prevented from rotating in the circumferential direction in relation to the hose connector. Within the framework of the invention, the torque threshold value, in a preferred manner, is greater than 10 Nm, further preferably greater than 20 Nm, further preferably greater than 30 Nm, in a particular preferred manner greater than 40 Nm. Further torque threshold values preferred within the framework of the invention are within the range of between 10 Nm and 50 Nm, further preferably within the range of between 10 Nm and 40 Nm, further preferably within the range of between 20 Nm and 30 Nm, in a particularly preferred manner within the range of between 40 Nm and 50 Nm.

The invention has recognized that a correspondingly realized anti-rotation protection allows for simple alignment and fixing of the hose during assembly. Thus, a hose fastened to the hose connector can be aligned in the open position of the anti-rotation protection as a result of the hose connector being rotated in relation to the nut in the circumferential direction until the desired alignment is reached. The anti-rotation protection can then be transferred from the open position into the closed position by the nut interacting with the hose connection part in order to fix the hose in the desired alignment.

As described above, the nut is matched to a hose connection part. The hose connection part can be a hose connection part for a fluid hose, preferably for a liquid hose, in a particularly preferred manner for a fuel pump hose, including a fluid channel on the one end of which is arranged a connecting device which allows for a liquid-tight connection to the nut, it being possible for the connecting device to be any suitable connecting device that is known in the prior art, wherein the connecting device in a preferred manner includes an internal thread which can be connected to a corresponding external thread of the nut, wherein the hose connection part includes a structural element which is realized for the purpose of transferring the anti-rotation protection of the nut from an open position into a closed position. The nut can be matched in particular to a hose connection part of the type described below. Reference is made explicitly to the statements below regarding the hose connection part according to the invention in the context of the nut to avoid repetition.

The nut, as described above, is matched to a hose connector. The hose connector can be a hose connector for a fluid hose, preferably for a liquid hose, in a particularly preferred manner for a fuel pump hose, including a tube socket for the fastening of the fluid hose, wherein the outside surface of the hose connector comprises a support surface for the nut, wherein the dimensions of the hose connector are matched to the nut such that the hose connector can be encompassed in a form-fitting manner by the nut in such a manner that the hose connector and the nut are rotatable in relation to one another in the circumferential direction. The nut can be matched in particular to a hose connector of the type described below. Reference is made explicitly to the statements below regarding the hose connector in the context of the nut to avoid repetition.

Within the framework of the invention, in a preferred manner the nut is realized such that the anti-rotation protection, at a certain point of the connecting operation between the nut and the hose connection part, is transferred as a result of the structural element of the hose connection part from the open position into the closed position when the nut is connected to the hose connection part. The advantage of this is that the hose is fixed at a certain point of the connecting operation. Said point is preferably toward the end of the connecting operation. It is particularly advantageous when the nut is realized such that the anti-rotation protection does not interact with the structural element of the hose connection part in order to transfer the anti-rotation protection from the open position into the closed position until the nut is almost completely connected to the hose connection part. Almost completely connected, within the framework of the invention, means that only a small effort is still required to terminate the connecting operation between the nut and the hose connection part. The advantage of this is that the hose does not have to be aligned until toward the end of the connecting operation and is able to be fixed in the desired alignment with a small amount of effort. Explained by way of the example of a screw connection, this means that the fitter can screw-connect the hose connection part extensively with the nut arranged on the hose connector, for example by means of manual assembly, before the hose is aligned toward the end of the screw-connection operation and then, for example by means of key assembly, is fixed as a result of interaction between the nut and the hose connection part.

In a preferred manner, the connecting device of the nut is arranged on the outside surface of the nut. Within the framework of the invention, the outside surface of the nut designates that side of the nut that is remote from the hose connector when the nut is arranged on the hose connector. In a corresponding manner, the inside surface of the nut, within the framework of the invention, designates that side of the nut that faces the hose connector when the nut is arranged on the hose connector.

The anti-rotation protection is preferably arranged on the inside surface of the nut. This simplifies the interaction between the anti-rotation protection and the hose connector. It is advantageous when the anti-rotation protection is arranged in the region of the connecting device. This simplifies the interaction between the nut and the hose connection part in order to transfer the anti-rotation protection from an open position into a closed position. Both the anti-rotation protection and the connecting device of the nut preferably are arranged in the region of the first end of the receiving means. In a particularly preferred manner, the anti-rotation protection is arranged on the inside surface of the nut in the region of the first end of the receiving means, the anti-rotation protection projecting into the receiving means, and the connecting device is arranged on the outside surface of the nut in the region of the first end of the receiving means, the connecting device being situated outside the receiving means.

Within the framework of the invention, the interaction between the nut and the hose connection part can include the exerting of a force onto the anti-rotation protection as a result of the structural element of the hose connection part, in particular the exerting of a radial force.

An advantageous embodiment of the invention provides that the anti-rotation protection includes at least one clamping element which, in a preferred manner, is arranged on the inside surface of the nut and is transferable from an open position, which allows for a rotational movement of the nut in the circumferential direction in relation to the hose connector when the nut is arranged on the hose connector, into a clamping position in which the clamping element, to prevent a rotational movement of the nut in the circumferential direction relative to the hose connector, is pressed against the hose connector when the nut is arranged on the hose connector.

Within the framework of the invention, the terms open position and clamping position are not restricted to discrete states. Within the framework of the invention, the transition from the open position into the clamping position can be flowing. The difference between the open position and the clamping position can depend on a certain torque that is necessary to cause the nut to rotate in the circumferential direction in relation to the hose connector. In other words, within the framework of the invention the term clamping position also includes such embodiments of the invention where the nut rotating in the circumferential direction in relation to the hose connector is prevented below a certain torque threshold value, which is preferably chosen such that in the normal use of the nut according to the invention, or of the hose connector according to the invention, the nut is prevented from rotating in the circumferential direction in relation to the hose connector. Within the framework of the invention, the torque threshold value, in a preferred manner, is greater than 10 Nm, further preferably greater than 20 Nm, further preferably greater than 30 Nm, in a particular preferred manner greater than 40 Nm. Further torque threshold values preferred within the framework of the invention are within the range of between 10 Nm and 50 Nm, further preferably within the range of between 10 Nm and 40 Nm, further preferably within the range of between 20 Nm and 30 Nm, in a particularly preferred manner within the range of between 40 Nm and 50 Nm.

In a preferred manner, the at least one clamping element is dimensioned and arranged such that the structural element of the hose connection part is able to act directly on the clamping element. This enables a comparatively simple structural realization.

In an advantageous manner, the nut is realized such that the at least one clamping element, at a certain point of the connecting operation between the nut and the hose connection part, is transferred as a result of interaction with the structural element of the hose connection part from the open position into the clamping position when the nut is connected to the hose connection part. The advantage of this is that the fixing of the hose is effected at a certain point of the connecting operation. Said point is preferably toward the end of the connecting operation. The at least one clamping element is preferably arranged and dimensioned such that it does not interact with the structural element of the hose connection part in order to transfer the clamping element from the clamping position into the open position until the nut is almost completely connected to the hose connection part. The advantage of this latter is that the hose does not have to be aligned until toward the end of the connecting operation and is able to be fixed in the desired alignment with little effort.

The at least one clamping element is preferably designed for the purpose of being held in the clamping position by means of a clamping force, in a preferred manner a radial clamping force. In a particularly preferred embodiment of the invention, the at least one clamping element is designed for the purpose of being held in the clamping position by means of a radial clamping force as a result of the direct influence of a structural element.

It can be provided that the anti-rotation protection includes at least two clamping elements. In an advantageous manner, the clamping elements are spaced apart from one another in the circumferential direction. The spacings between the clamping elements can be the same size in each case. The anti-rotation protection preferably includes between 2 and 12 clamping elements, further preferably between 4 and 8 clamping elements, in a particularly preferred manner 6 clamping elements which can each be spaced apart from one another in the circumferential direction.

In an advantageous manner, the connecting device preferably includes an external thread which is connectable in a liquid-tight manner to a corresponding internal thread of the hose connection part, wherein the clamping element or the clamping elements project beyond the external thread in the axial direction.

It can be provided that the connecting device is arranged on the outside surface of the nut in the region of the first end of the receiving means and/or the clamping element or the clamping elements are arranged on the inside surface of the nut in the region of the first end of the receiving means.

The clamping element or the clamping elements are preferably arranged on the inside surface of the nut. This simplifies the interaction with the hose connector. It is advantageous when the clamping element or the clamping elements are arranged in the region of the connecting device. This simplifies the interaction between the clamping elements and the structural element of the hose connection part in dependence on the connecting operation between the nut and the hose connection part. Both the clamping element or the clamping elements and the connecting device of the nut are preferably arranged in the region of the first end of the receiving means. In a particularly preferred manner, the clamping element or the clamping elements are arranged on the inside surface of the nut in the region of the first end of the receiving means, the clamping element or the clamping elements projecting into the receiving means, and the connecting device is arranged on the outside surface of the nut in the region of the first end of the receiving means, the connecting device being situated outside the receiving means.

The nut can consist of plastics material, preferably an electrically conductive plastics material, in a particularly preferred manner an electrically conductive plastics material with electric resistance according to EN 13617-2 of less than 100 000 Ohm, preferably with electric resistance according to EN 13617-2 of between 200 and 1000 Ohm. The plastics material is preferably selected from the group consisting of polyamides (PA) and polyetheretherketones (PEEK).

In a preferred manner, the nut is realized for the purpose of the connection between the nut and the hose connection part withstanding a tensile force of at least 2000 N over 2 min, preferably at least 2000 N over 5 min. The measurement is effected according to EM 13483 Appendix K, the force being applied by the clamps of the test device being pulled apart at a speed of (75±5) mm/min.

In an advantageous manner, the nut comprises reinforcing elements, wherein the reinforcing elements are preferably spaced apart from one another in the circumferential direction and/or are preferably arranged on the inside surface of the nut, in a preferred manner in the region of the first end of the receiving means and/or are preferably arranged in the region of the connecting device. The arrangement of the reinforcing elements in the region of the connecting device serves to increase the tensile strength of the connection between the nut and the hose connection part.

The receiving means for the hose connector can extend advantageously over the entire axial extension of the nut.

In an advantageous manner, the nut is designed for the purpose of being connected to a hose connection part for a fuel hose and/or gas hose, preferably to a fuel pump connection, in a particularly preferred manner to a fuel pump connection for a coaxial hose.

It is advantageous when the connecting device of the nut is realized such that it also allows for a connection to a hose connection part which does not comprise a structural element according to the invention. Such a connection allows just for the alignment of the hose and not for the fixing thereof. However, it enables stepwise retrofitting of existing hose connections by the hose connection first of all being retrofitted with a nut according to the invention and a hose connector according to the invention before being retrofitted with a hose connection part according to the invention.

The nut serves for arrangement on a hose connector and can be matched to said arrangement. The invention is not restricted to a certain type of arrangement. For example, the nut can be placed onto a hose connector. In said case, it is advantageous when the nut comprises at least one latching element which can interact with at least one holding element of the hose connector in order to fix the nut on the hose connector in the axial direction and/or when at least one clamping element of the nut is realized as a latching element in such a manner that it is able to interact with at least one holding of the hose connector in order to fix the nut on the hose connector in the axial direction.

The nut can be realized as a polygonal nut, preferably as a triangular nut, a square nut, a hexagon nut, an octagon nut or a twelve-point nut, in a particularly preferred manner as a hexagon nut. In an advantageous manner, the polygonal structure is arranged on the outside surface of the nut in the region of the second end of the receiving means.

An additional object of the invention is a hose connector. This will be explained below.

Hose connectors are known to the expert. They comprise a passage for the fluid and, as a rule, a tube socket for the fastening of the hose.

The hose connector according to the invention is a hose connector for a fluid hose, preferably for a liquid hose, in a particularly preferred manner for a fuel pump hose, having a tube socket for the fastening of the fluid hose, wherein the outside surface of the hose connector comprises a support surface for the nut, wherein the dimensions of the hose connector are matched to the nut such that the hose connector can be encompassed by the nut in a form-fitting manner in such a manner that the hose connector and the nut are rotatable in relation to one another in the circumferential direction.

The hose connect, as described above, is matched to a nut. In this case, this can be a nut for arrangement on the hose connector, which includes a connecting device, which is connectable in a fluid-tight manner to a hose connection part, and a receiving means for the hose connector, having a first end and a second end, wherein the receiving means is realized for the purpose of encompassing the hose connector in a form-fitting manner in the circumferential direction in such a manner that the nut and the hose connect- or are rotatable in relation to one another in the circumferential direction, wherein the nut comprises anti-rotation protection which is realized such that as a result of a structural element of the hose connection part, it is transferable from an open position, in which the nut is arranged on the hose connector, into a closed position in which rotating of the nut in the circumferential direction in relation to the hose connector is prevented when the nut is arranged on the hose connector. The hose connector can be matched in particular to a nut of the type described further above. Reference is made explicitly to the above statements regarding the nut in the context of the hose connector to avoid repetition. How the terms open position and closed position are to be understood within the framework of the invention has already been explained in the context of the nut according to the invention. Reference is made to said statements in the context of the hose connector.

In an advantageous manner, the hose connector comprises a holding device which is realized for the purpose of preventing an axial movement of the nut relative to the hose connector, wherein the holding device preferably includes two holding elements which define the support surface for the nut between them. At least one of the holding elements is preferably realized as a flange. In a particularly preferred manner, both holding elements are realized as flanges. The flange or the flanges can extend continuously in the circumferential direction. However, it is also possible for the flange or flanges to comprise one or several interruptions in the circumferential direction.

In the case of an advantageous embodiment, the hose connector comprises on its outside surface at least one portion which is provided for the purpose of serving as an abutment at least in part for the at least one clamping element of the nut. Said portion is preferably arranged in the region of the contact surface.

The hose connector is preferably realized for the purpose of contacting the hose connection part by way of its outside surface in order to generate electrical through-flow. The hose connector is realized in a particularly preferred manner for the purpose of contacting a hose connection part by way of its holding elements in order to generate electrical through-flow.

The hose connector is preferably designed for use with a fuel hose, preferably a coaxial hose for fuels.

An additional object of the invention is a hose connection part. This will be explained below.

The hose connection part according to the invention is a hose connection part for a fluid hose, preferably for a liquid hose, in a particularly preferred manner for a fuel pump hose, the hose connection part including a fluid channel at the one end of which is arranged a connecting device which allows for a liquid-tight connection to an above-described nut, wherein the hose connection part comprises a structural element which is realized for the purpose of transferring the anti-rotation protection of the nut from an open position into a closed position. How the terms open position and closed position are to be understood within the framework of the invention has already been explained in the context of the nut according to the invention. Reference is made to said statements in the context of the hose connection part.

The term fluid channel, within the framework of the invention, designates a channel which is designed for the passage of a fluid. The fluid channel can preferably comprise a substantially cylindrical form.

The hose connection part, as described above, is matched to a nut. In this case, this can be a nut for arrangement on a hose connector, which includes a connecting device, which is connectable in a fluid-tight manner to the hose connection part, and a receiving means for the hose connector, having a first end and a second end, wherein the receiving means is realized for the purpose of encompassing the hose connector in a form-fitting manner in the circumferential direction in such a manner that the nut and the hose connector are rotatable in relation to one another in the circumferential direction, wherein the nut comprises anti-rotation protection which is realized such that as a result of a structural element of the hose connection part, it is transferable from an open position, in which the nut is arranged on the hose connector, into a closed position in which rotating of the nut in the circumferential direction in relation to the hose connector is prevented when the nut is arranged on the hose connector. The hose connection part can be matched, in particular, to a nut of the type described further above. Reference is made explicitly to the above statements regarding the nut in the context of the hose connector to avoid repetition.

The connecting device of the hose connection part preferably includes an internal thread which can be connected to a corresponding external thread of the nut.

In an advantageous manner, the structural element is arranged and dimensioned such that the anti-rotation protection of the nut, at a certain point of the connecting operation between the hose connection part and the nut, is transferred as a result of the structural element of the hose connection part from the open position into the closed position when the hose connection part is connected to the nut. The advantage of this is that the hose is fixed at a certain point of the connecting operation. Said point is preferably toward the end of the connecting operation. The hose connection part is preferably realized such that the structural element does not interact with the nut in order to transfer the anti-rotation protection from the open position into the closed position until the hose connection part is almost completely connected to the nut. The advantage of this latter is that the hose does not have to be aligned until toward the end of the connecting operation and is able to be fixed in the desired alignment with a small amount of effort.

In the case of an advantageous embodiment, the structural element comprises at least one feature, preferably both features, selected from the following group of features:
  the structural element is ring-shaped, preferably circular,
  the structural element is arranged in the region of the connecting device of the hose connection part, wherein the structural element preferably adjoins the termination of the internal thread.

The structural element can preferably be realized for the purpose of interacting with one of the above-described embodiments of the nut which includes at least one clamping element, wherein the structural element comprises at least one feature, preferably at least two features, in a particularly preferred manner all three features selected from the following group of features:
  the structural element is realized for the purpose of acting on at least one clamping element of the nut,
  the structural element is realized for the purpose of exerting a clamping force, preferably a radial clamping force, on the at least one clamping element,
  the structural element brings about a reduction in the internal diameter of the hose connection part in such a manner that a clamping force, preferably a radial clamping force, is exerted on the at least one clamping element of the nut when the hose connection part is connected to the nut, wherein the structural element is preferably realized for the purpose of producing direct metal contact with a hose connector.

The above-mentioned feature that the structural element is realized for the purpose of producing direct metal contact with a hose connector, is particularly preferred for such countries in which electric through-flow is required. The hose connector can be a hose connector for a fluid hose, preferably for a liquid hose, in a particularly preferred manner for a fuel pump hose, including a tube socket for the fastening of the fluid hose, wherein the outside surface of the hose connector comprises a support surface for a nut, preferably for the nut described further above, wherein the dimensions of the hose connector are matched to the nut such that the hose connector can be encompassed in a form-fitting manner by the nut in such a manner that hose connector and the nut are rotatable in relation to one another in the circumferential direction. In particular, the hose connector can be a hose connector of the type described further above. Reference is made explicitly to the statements above regarding the hose connector in the context of the hose connection part to avoid repetition.

In a preferred embodiment of the invention, the structural element of the hose connection part is designed for the purpose of acting directly on the at least one clamping element of the nut. In a particularly preferred embodiment, the structural element is designed for the purpose of holding the at least one clamping element of the nut in the clamping position by means of a radial clamping force. How the term clamping position is to be understood within the framework of the invention has already been explained in the context of the nut according to the invention. Reference is made to said statements in the context of the hose connection part.

The hose connection part nut is preferably a hose connection part for a fuel hose and/or gas hose, further preferably a fuel pump connection, in a particularly preferred manner a fuel pump connection for a coaxial hose.

It is advantageous when the hose connection part is realized such that the connecting device also allows for a connection to a counterpart which does not comprise anti-rotation protection according to the invention. This enables stepwise retrofitting of existing hose connections by the hose connection first of all being retrofitted with a hose connection part according to the invention before being retrofitted with a nut according to the invention and a hose connector according to the invention.

In an advantageous manner, the hose connection part comprises several connections, at least one of which preferably includes a rotatably mounted nut, the rotatably mounted nut preferably comprising an internal thread. In a preferred manner, the hose connection part comprises at least two, in a particularly preferred manner at least three connections, it being possible for one of the connections to be realized as a gas outlet nipple. In the case of a preferred embodiment, the hose connection part comprises in each case a connection at both ends of the fluid channel and as an option a third connection which is arranged between the ends of the fluid channel, it being possible for the third optional connection to be a gas outlet nipple. The hose connection part can include a feed line for the third channel, said feed line being arranged in the fluid channel.

An additional object of the invention is a kit for a hose connection, including at least two components, preferably all components, selected from the group consisting of an above-described nut, an above-described hose connector and an above-described hose connection part.

In the cases where the kit includes the nut and the hose connector, in a preferred manner the nut is arranged on the hose connector. In the case of other advantageous embodiments of the kit, the nut is not arranged on the hose connector.

A nut that is suitable for the kit according to the invention, as well as a hose connection part that is suitable for the kit and a suitable hose connector have already been described above. Reference is made to said statements in the context of the kit according to the invention to avoid repetition. Within the framework of the kit according to the invention, any combination of two or three components from the group consisting of an above-described nut, an above-described hose connector and an above-described hose connection part is hereby explicitly disclosed.

The invention additionally provides for the use of an above-described nut with an above-described hose connector. Within the framework of the use according to the invention, any combination of an above-described nut with an above-described hose connector is hereby explicitly disclosed. Reference is made explicitly to the above statements regarding the nut and the hose connector in the context of the use according to the invention to avoid repetition.

The invention additionally provides for the use of an above-described nut with an above-described hose connection part. Within the framework of the use according to the invention, any combination of an above-described nut with an above-described hose connection part is hereby explicitly disclosed. Reference is made explicitly to the above statements regarding the nut and the hose connection part in the context of the use according to the invention to avoid repetition.

The invention additionally provides for the use of an above-described nut with an above-described hose connector and an above-described hose connection part. Within the framework of the use according to the invention, any combination of an above-described nut with an above-described hose connector and an above-described hose connection part is hereby explicitly disclosed. Reference is made explicitly to the above statements regarding the nut, the hose connection part and the hose connector in the context of the use according to the invention to avoid repetition.

The invention additionally provides for the use of an above-described hose connector with an above-described nut. Within the framework of the use according to the invention, any combination of an above-described hose connector with an above-described nut is hereby explicitly disclosed. Reference is made explicitly to the above statements regarding the nut and the hose connector in the context of the use according to the invention to avoid repetition.

The invention additionally provides for the use of an above-described hose connector with an above-described nut and an above-described hose connection part. Within the framework of the use according to the invention, any combination of an above-described hose connector part with an above-described nut and an above-described hose connection part is hereby explicitly disclosed. Reference is made explicitly to the above statements regarding the nut, the hose connection part and the hose connector in the context of the use according to the invention to avoid repetition.

The invention additionally provides for the use of an above-described hose connection part with an above-described nut. Within the framework of the use according to the invention, any combination of an above-described hose connection part with an above-described nut is hereby explicitly disclosed. Reference is made explicitly to the above statements regarding the nut and the hose connection part in the context of the use according to the invention to avoid repetition.

The invention additionally provides for the use of an above-described hose connection part with an above-described nut and an above-described hose connector. Within the framework of the use according to the invention, any combination of an above-described hose connection part with an above-described nut and an above-described hose connector is hereby explicitly disclosed. Reference is made explicitly to the above statements regarding the nut, the hose connector and the hose connection part in the context of the use according to the invention to avoid repetition.

The invention also provides an arrangement, including a hose connector for a fluid hose, preferably for a liquid hose, in a particularly preferred manner for a fuel pump hose, and a nut which will be described below.

The arrangement according to the invention includes
a) a hose connector with a first end, which is realized as a tube socket for the fastening of the fluid hose, and a second end which comprises a support for the nut and
b) a nut having a connecting device for a hose connection part, wherein the nut encompasses the hose connector in a form-fitting manner at its second end in the circumferential direction in such a manner that the nut and the hose connector are rotatable in relation to one another in the circumferential direction, wherein the nut comprises anti-rotation protection which is transferable from an open position, in which the nut and the hose connector are rotatable in relation to one another in the circumferential direction, into a closed position in which rotating of the nut in the circumferential direction in relation to the hose connector is prevented, the anti-rotation protection and the connecting device being arranged on the same end of the nut. How the terms open position and closed position are to be understood within the framework of the invention has already been explained in the context of the nut according to the invention. Reference is made to said statements in the context of the arrangement.

In the case of a preferred embodiment of the arrangement, the anti-rotation protection is arranged on the inside surface of the nut in the region of the connecting device and/or the connecting device is arranged on the outside surface of the nut.

The anti-rotation protection preferably comprises at least one clamping element which, in a preferred manner, is arranged on the inside surface of the nut and is transferable from an open position, which allows for a rotational movement of the nut in the circumferential direction in relation to the hose connector when the nut is arranged on the hose connector, into a clamping position in which the clamping element, to prevent a rotational movement of the nut in the circumferential direction relative to the hose connector, is pressed against the hose connector when the nut is arranged on the hose connector. How the terms open position and clamping position are to be understood within the framework of the invention has already been explained in the context of the nut according to the invention. Reference is made to said statements in the context of the arrangement.

The at least one clamping element is preferably designed for the purpose of being held in the clamping position by means of a clamping force, in a preferred manner a radial clamping force.

It can be provided that the anti-rotation protection includes at least two clamping elements. In an advantageous manner, the clamping elements are spaced apart from one another in the circumferential direction. The spacings between the clamping elements can be the same size in each case. The anti-rotation protection preferably includes between 2 and 12 clamping elements, further preferably between 4 and 8 clamping elements, in a particularly preferred manner 6 clamping elements which are spaced apart from one another in each case in the circumferential direction.

In an advantageous manner, the connecting device includes an external thread which is connectable in a liquid-tight manner to a corresponding internal thread of a hose connection part, wherein the clamping element or the clamping elements project beyond the external thread in the circumferential direction.

It can be provided that the connecting device is arranged on the outside surface of the nut and/or the clamping element or the clamping elements are arranged on the inside surface of the nut.

The clamping element or the clamping elements are preferably arranged on the inside surface of the nut. This simplifies the interaction with the hose connector. It is advantageous when the clamping element or the clamping elements are arranged in the region of the connecting device. In a particularly preferred manner, the clamping element or the clamping elements are arranged on the inside surface of the nut and the connecting device is arranged on the outside surface of the nut, the connecting device being situated outside the receiving means.

The nut can consist of plastics material, preferably an electrically conductive plastics material, in a particularly preferred manner an electrically conductive plastics material with electric resistance according to EN 13617-2 of less than 100 000 Ohm, preferably with electric resistance according to EN 13617-2 of between 200 and 1000 Ohm. The plastics material is preferably selected from the group consisting of polyamides (PA) and polyetheretherketones (PEEK).

In a preferred manner, the nut is realized for the purpose of the connection between the nut and the hose connection part withstanding a tensile force of at least 2000 N over 2 min, preferably at least 2000 N over 5 min. The measurement is effected according to EM 13483 Appendix K, the force being applied by the clamps of the test device being pulled apart at a speed of (75±5) mm/min.

In an advantageous manner, the nut comprises reinforcing elements, wherein the reinforcing elements are preferably spaced apart from one another in the circumferential direction and/or are preferably arranged on the inside surface of the nut, in a preferred manner in the region of the first end of the receiving means and/or are preferably arranged in the region of the connecting device. The arrangement of the reinforcing elements in the region of the connecting device serves to increase the tensile strength of the connection between the nut and the hose connection part.

In an advantageous manner, the nut is designed for the purpose of being connected to a hose connection part for a fuel hose and/or gas hose, preferably to a fuel pump connection, in a particularly preferred manner to a fuel pump connection for a coaxial hose.

The nut can be realized as a polygonal nut, preferably as a triangular nut, a square nut, a hexagon nut, an octagon nut or a twelve-point nut, in a particularly preferred manner as a hexagon nut. In an advantageous manner, the polygonal structure is arranged on the outside surface of the nut in the region of the second end of the receiving means.

In an advantageous manner, the hose connector projects beyond the two ends of the nut in the axial direction.

The hose connector of the arrangement is a hose connector for a fluid hose, preferably for a liquid hose, in a particularly preferred manner for a fuel pump hose.

In an advantageous manner, the hose connector comprises a holding device which is realized for the purpose of preventing an axial movement of the nut relative to the hose connector, wherein the holding device preferably includes two holding elements which define the support surface for the nut between them. At least one of the holding elements is preferably realized as a flange. In a particularly preferred manner both holding elements are realized as flanges. The flange or the flanges can extend continuously in the circumferential direction. However, it is also possible for the flange or the flanges to comprise one or several interruptions in the circumferential direction.

In the case of an advantageous embodiment, the hose connector comprises on its outside surface at least one portion which is provided for the purpose of serving as an abutment at least in part for the at least one clamping element of the nut. Said portion is preferably arranged in the region of the contact surface.

The hose connector is preferably realized for the purpose of contacting the hose connection part by way of its outside surface in order to generate electrical through-flow. In a particularly preferred manner, the hose connector is realized for the purpose of contacting a hose connection part by way of its holding elements in order to generate electrical through-flow.

The hose connector is preferably designed for use with a fuel hose, preferably a coaxial hose for fuel.

Advantageous embodiments of the invention are described below as an example by way of the drawings, in which:

FIG. 1: shows an embodiment of a nut according to the invention.

Figure 2:
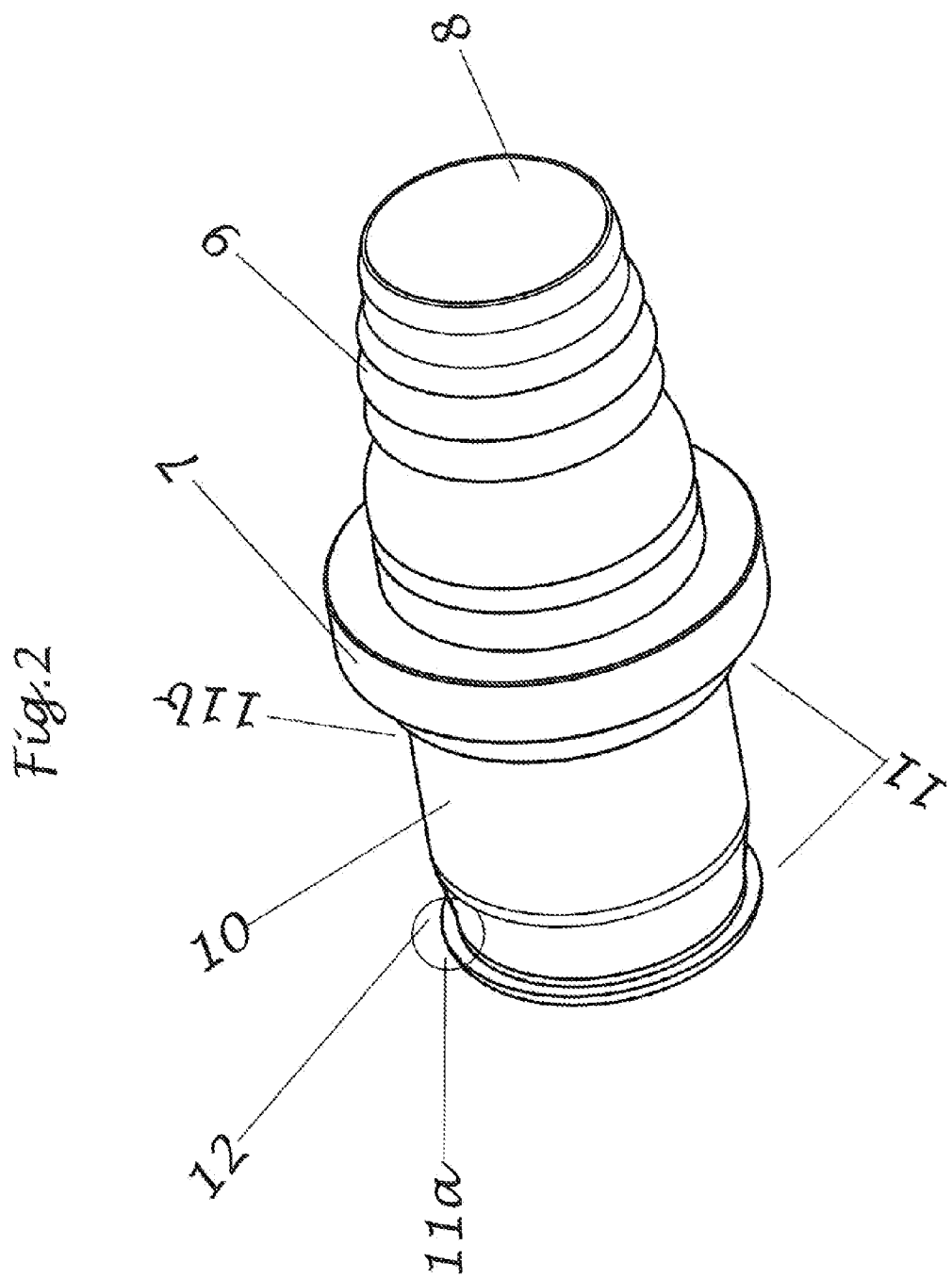

FIG. 2: shows an embodiment of a hose connector according to the invention.

Figure 3:
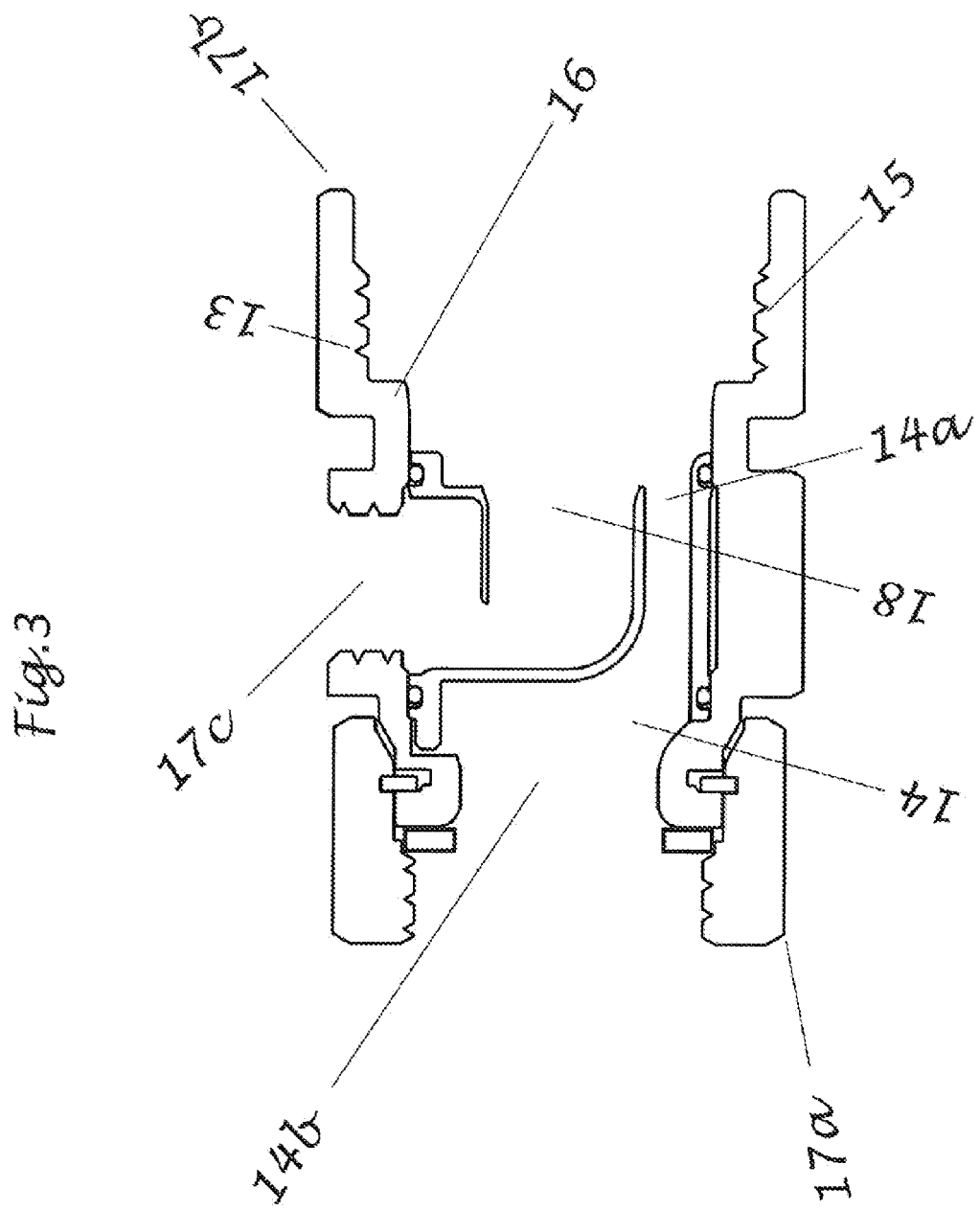

FIG. 3: shows an embodiment of a hose connection part according to the invention.

Figure 4:
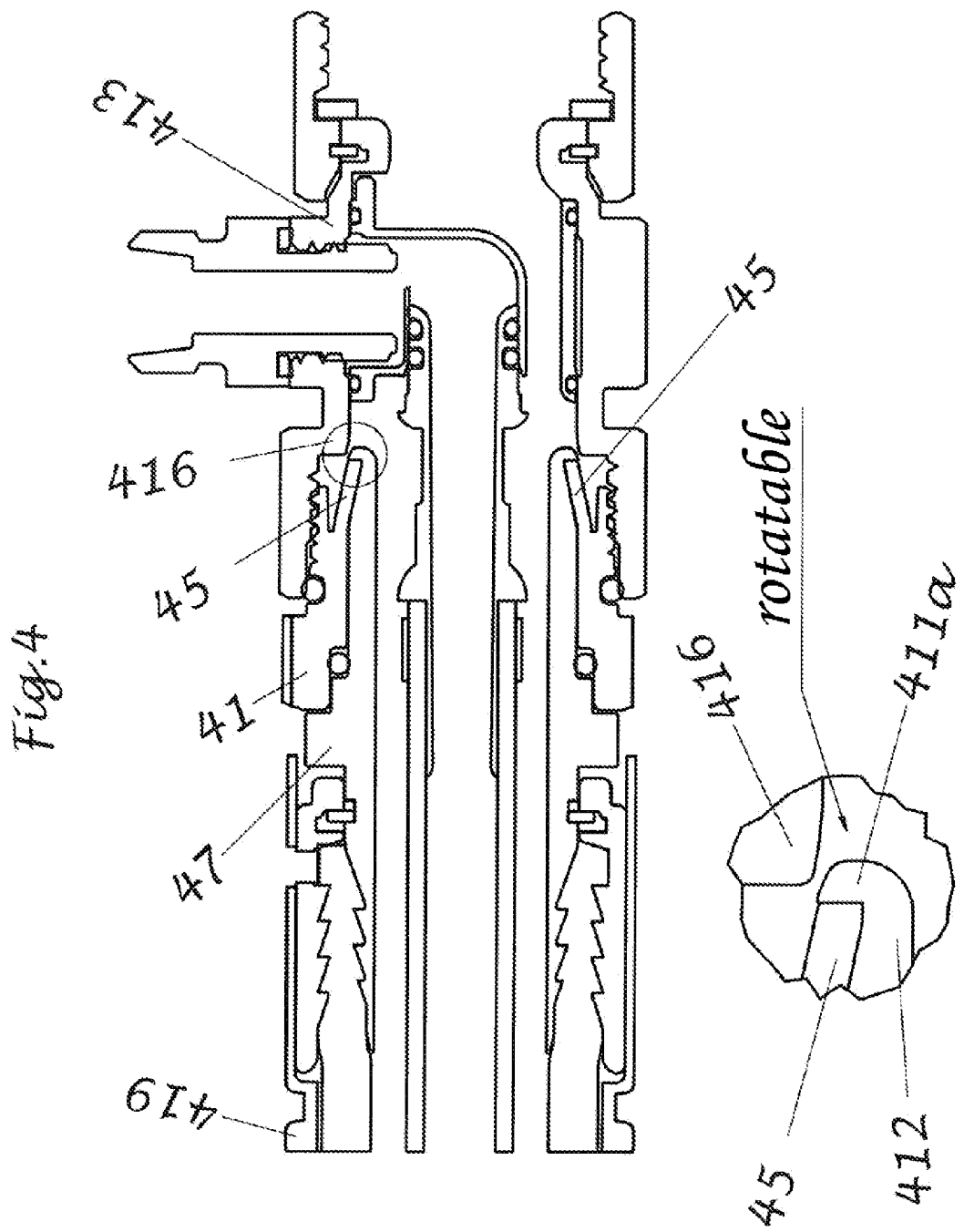

FIG. 4: shows an arrangement including a nut, a hose connector and a hose connection part, the anti-rotation protection of the nut being situated in the open position.

Figure 5:
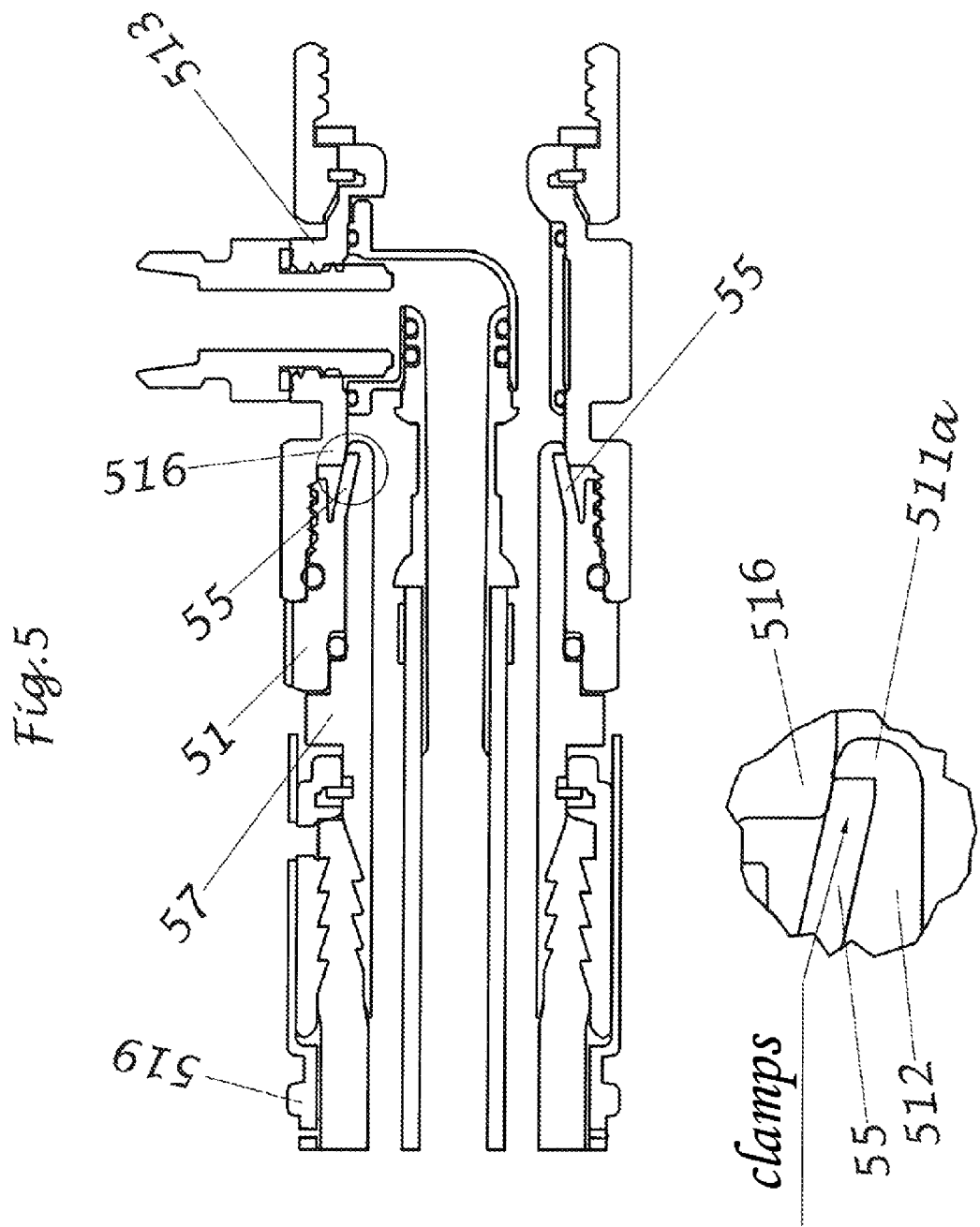

FIG. 5: shows an arrangement including a nut, a hose connector and a hose connection part, the anti-rotation protection of the nut being situated in the closed position.

Figure 6:
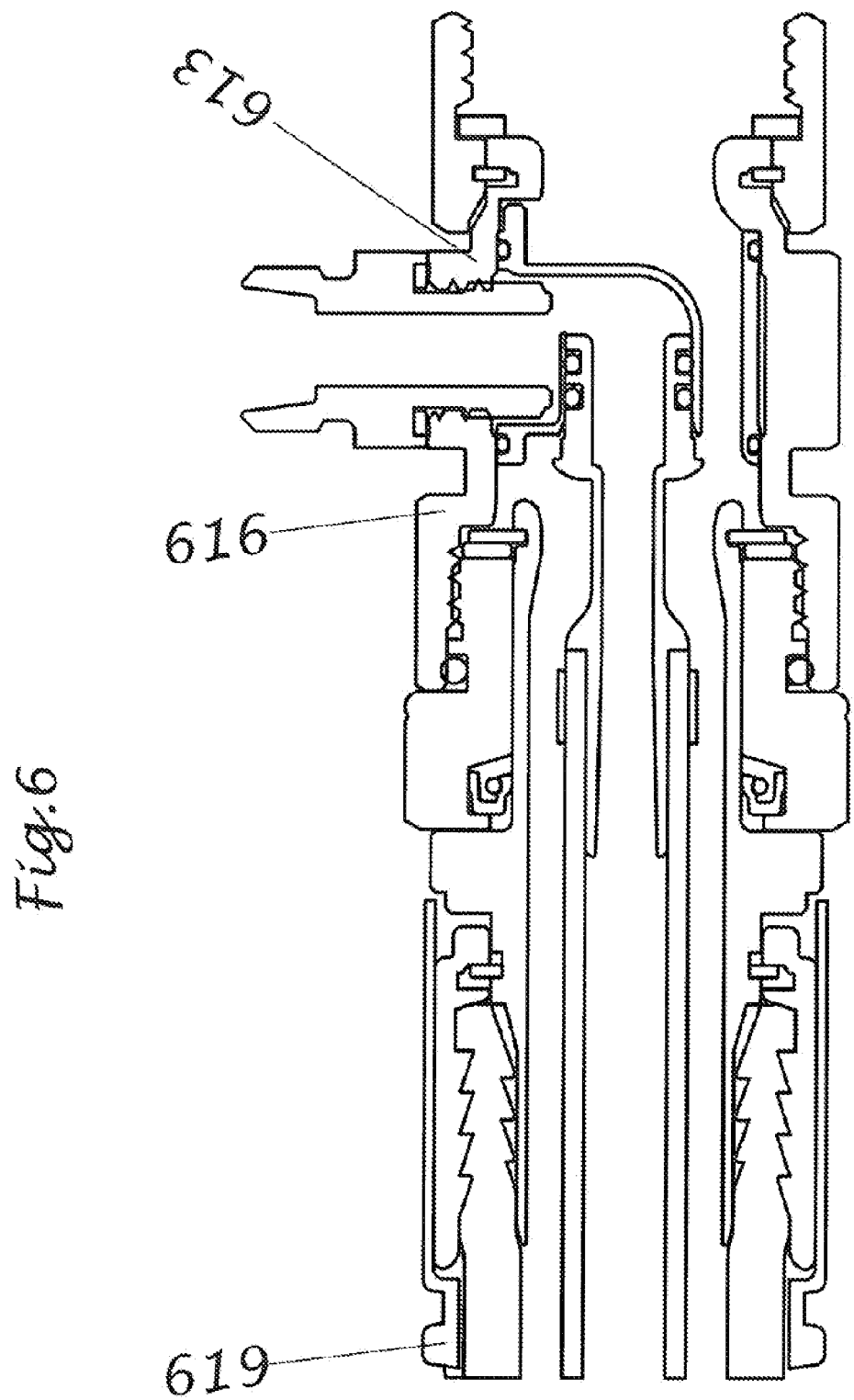

FIG. 6: shows an embodiment of a hose connection part according to the invention together with a conventional hose and hose connection.

FIG. 7: shows an embodiment of an arrangement according to the invention including a hose connector and a nut arranged on the hose connector.

FIG. 1 shows an advantageous embodiment of a nut (1) according to the invention. The nut (1) comprises a connecting device (2) which is realized as an external thread which is connectable in a fluid-tight manner to a corresponding internal thread of the hose connection part shown in FIG. 3.

The nut additionally comprises a receiving means (3) for the hose connector (7) shown in FIG. 2, having a first end (3a) and a second end (3b), wherein the receiving means is realized for the purpose of encompassing the hose connector (7) shown in FIG. 2 in a form-fitting manner in the circumferential direction in such a manner that the nut (1) and the hose connector (7) are rotatable in relation to one another in the circumferential direction. The receiving means (3) extends over the entire axial extension of the nut (1).

The nut (1) comprises anti-rotation protection (4) which is realized such that, as a result of a structural element of the hose connection part shown in FIG. 3, it is transferable from an open position, in which the nut (1) and the hose connector (7) shown in FIG. 2 are rotatable in relation to one another in the circumferential direction when the nut (1) is arranged on the hose connector (7), into a closed position in which rotating of the nut (1) in the circumferential direction in relation to the hose connector (7) is prevented when the nut (1) is arranged on the hose connector (7).

The nut (1) in FIG. 1 is realized such that the anti-rotation protection (4), at a certain point of the connecting operation between the nut (1) and the hose connection part (13) shown in FIG. 3, is transferred as a result of the structural element of the hose connection part from the open position into the closed position when the nut (1) is connected to the hose connection part, as shown in FIGS. 4 and 5. Said point is preferably toward the end of the connecting operation.

The anti-rotation protection (4) is arranged on the inside surface of the nut (1) in the region of the first end (3a) of the receiving means (3), the anti-rotation protection (4) projecting into the receiving means (3), and the connecting device (2) is arranged on the outside surface of the nut (1) in the region of the first end (3a) of the receiving means (3), the connecting device (2) being situated outside the receiving means (3).

The anti-rotation protection (4) comprises 6 clamping element (5) which are spaced part from one another in the circumferential direction and are in each case transferable from an open position, which allows for the rotational movement of the nut in the circumferential direction relative to the hose connector shown in FIG. 2 when the nut (1) is arranged on the hose connector, into a clamping position in which the respective clamping element (5), to prevent a rotational movement of the nut (1) in the circumferential direction relative to the hose connector, is pressed against the hose connector when the nut (1) is arranged on the hose connector, as shown in FIGS. 4 and 5.

As can be seen from the Figures, the clamping elements (5) are each dimensioned and arranged such that the structural element of the hose connection part shown in FIG. 3 can act directly on the clamping elements (5).

In this case, the nut (1) is realized such that the respective clamping element (5), at a certain point of the connecting operation between the nut (1) and the hose connection part shown in FIG. 3, is transferred as a result of interaction with the structural element of the hose connection part from the open position into the closed position when the nut (1) is connected to the hose connection part. Said point is preferably toward the end of the connecting operation. In this case, each of the clamping elements (5) is arranged and dimensioned such that it does not interact with the structural element of the hose connection part in order the transfer the clamping element (5) from the clamping position into the open position, until the nut (1) is connected almost completely to the hose connection part. This is shown in FIGS. 4 and 5.

The clamping elements (5) are designed for the purpose of being held in the clamping position by means of a radial clamping force as a result of the direct influence of the structural element of the hose connection part shown in FIG. 3.

As can be seen in FIG. 1, the clamping elements (5) are arranged on the inside of the nut (1) and project beyond the external thread (2) in the axial direction.

The nut (1) shown consists of an electrically conductive plastics material (polyamide) with electric resistance according to EN 13617-2 of between 200 and 1000 Ohm.

The nut (1) comprises reinforcing elements (6) auf, the reinforcing elements (6) being spaced apart from one another in the circumferential direction and arranged on the inside surface of the nut (1) in the region of the first end (3a) of the receiving means (3). In the case of the embodiment shown in FIG. 3, the reinforcing elements (6) are consequently arranged in the region of the connecting device (2).

The connecting device (2) of the nut (1) is realized such that it also allows for a connection to a hose connection part which does not comprise a structural element according to the invention.

The nut (1) shown in FIG. 1 can be placed onto the hose connector (7) shown in FIG. 2, the clamping elements (5) of the nut being realized as latching elements in such a manner that they can interact with a holding element (11a) of the hose connector (7) shown in FIG. 2 in order to fix the nut (1) on the hose connector (7) in the axial direction.

The nut is realized as a hexagon nut, the hexagon structure being arranged on the outside surface of the nut (1) in the region of the second end (3b) of the receiving means (3).

FIG. 2 shows an advantageous embodiment of a hose connector (7) according to the invention which is designed for use with a coaxial hose for fuel (not shown). The hose connector (7) comprises a passage (8) for a fluid and a tube socket (9) for the fastening of the hose.

The outside surface of the hose connector (7) comprises a support surface (10) for the nut (1) shown in FIG. 1, the dimensions of the hose connector (7) being matched in such a way to the nut (1) shown in FIG. 1 that the hose connector (7) can be encompassed in a form-fitting manner by the nut (1) in such a manner that the hose connector (7) and the nut (1) are rotatable in relation to one another in the circumferential direction.

The hose connector (7) comprises a holding device (11) which is realized for the purpose of preventing an axial movement of the nut (1) shown in FIG. 1 in relation to the hose connector (7), the holding device including two holding elements (11a, 11b) which define the contact surface (10) for the nut (1) between them. Both holding elements (11a, 11b) are realized as continuous flanges which extend in the circumferential direction.

The hose connector (7) shown in FIG. 2 comprises on its outside surface at least one portion (12) which is provided for the purpose of serving as an abutment at least in part for the clamping elements (5) of the nut (1) shown in FIG. 1. As can be seen from FIG. 2, said portion (12) is arranged in the region of the contact surface (10).

FIG. 3 shows an advantageous embodiment of a hose connection part (13) according to the invention.

The hose connection part (13) shown is a fuel pump connection for a coaxial hose (not shown). The hose connection part (13) includes a fluid channel (14) at the one end (14a) of which is arranged a connecting device (15) which is realized as an internal thread which can be connected in a fluid-tight manner to the corresponding external thread (2) of the nut (1) shown in FIG. 1. The hose connection part (13) comprises a structural element (16) which is realized for the purpose of transferring the anti-rotation protection (4) of the nut (1) shown in FIG. 1 from an open position into a closed position.

The structural element (16) is arranged and dimensioned such that the anti-rotation protection (4) of the nut (1) shown in FIG. 1, at a certain point of the connecting operation between the hose connection part (13) and the nut (1), is transferred as a result of the structural element (16) of the hose connection part (13) from the open position into the closed position when the hose connection part (13) is connected to the nut (1). Said point is toward the end of the connecting operation, wherein the hose connection part (13) is realized such that the structural element (16) does not interact with the nut (1) in order to transfer the anti-rotation protection (4) from the open position into the closed position until the hose connection part (13) is almost completely connected to the nut (1). This is explained graphically in FIGS. 4 and 5.

The structural element (16) shown in FIG. 3 is circular and is arranged in the region of the connecting device (15) of the hose connection part (13), the structural element (16) adjoining the termination of the internal thread (15).

The structural element (16) is realized for the purpose of acting on the clamping elements (5) of the nut (1) shown in FIG. 1 by exerting a radial clamping force on the clamping elements (5), as shown in FIG. 5.

In particular, the structural element (16) brings about a reduction in the internal diameter of the hose connection part (13) in such a manner that a radial clamping force is exerted onto the clamping elements (5) of the nut (1) shown in FIG. 1 when the hose connection part (13) is connected to the nut (1), as shown in FIG. 5.

The structural element (16) of the hose connection part (13) is designed for the purpose of acting directly on the clamping elements (5) of the nut (1). In particular, it is designed for the purpose of holding the clamping elements (5) of the nut (1) in the clamping position by means of a radial clamping force, as can be seen from FIG. 5.

The hose connection part (13) is realized such that the connecting device (15) also allows for a connection to a counterpart which does not comprise anti-rotation protection according to the invention.

The hose connection part (13) shown comprises in each case a connection (17a, 17b) at both ends (14a, 14b) of the fluid channel (14) and a third connection (17c) which is arranged between the ends (14a, 14b) of the fluid channel (14) and which is a gas outlet nipple. Also shown is a feed line (18) to the third connection (17c), said feed line being arranged inside the fluid channel (14).

FIGS. 4 and 5 show the interaction between the nut (1, 41, 51) shown in FIG. 1 and the hose connector (7, 47, 57) shown in FIG. 2 and the hose connection part (13, 413, 513) shown in FIG. 3. The top image in each case shows the parts in their totality, whilst the bottom image shows an enlarged detail which shows the interaction between the clamping elements (5, 45, 55) and the structural element (16, 416, 516). Also shown is a holding element (11a, 411a, 511a) of the hose connector (7, 47, 57) as well as a portion (12, 412, 512) on the outside surface of the hose connector which is provided for the purpose of serving as an abutment for the clamping elements. FIG. 4, in this case, shows the clamping elements (45) in the open position and FIG. 5 shows the clamping elements (55) in the closed position. The holding element 511a has metal contact with the structural element 516.

As can be seen from FIG. 4, the nut (41) arranged on the hose connector (47) can be connected almost extensively to the hose connection part (413), for example by means of manual assembly, whilst the clamping elements (45) remain in the open position. This allows the hose (419) to be aligned. Then, as shown in FIG. 5, the structural element (516), at a certain point toward the end of the connecting operation, namely when the nut (51) is almost completely connected to the hose connection part (513), for example by means of key assembly, can transfer the clamping elements (55) into the clamping position and hold them in the clamping position by means of a radial clamping force for the duration of the connection.

FIG. 6 shows the interaction between a conventional hose connection 619 without positioning possibility and anti-rotation protection and a hose connection part 613 according to the invention, including structural element 616 which is realized such that the connecting device also allows for a connection to a counterpart which does not comprise anti-rotation protection according to the invention. This enables stepwise retrofitting of existing hose connections by the hose connection first of all being retrofitted with a hose connection part according to the invention before retrofitting with a nut according to the invention and a hose connector according to the invention.

FIG. 7 shows an embodiment of the invention including a hose connector (757) according to the invention and a nut (751) arranged on the hose connector.

The invention claimed is:

1. A combination comprising:
   a) a hose connection part (13) for a fluid hose;
   b) a hose connector (7) for a fluid hose; and
   c) a nut (1) for arrangement on said hose connector (7); wherein
   i) said nut (1) includes a connecting device (2) which is connectable in a fluid-tight manner to said hose connection part (13),
      wherein the nut (1) comprises a receiving means (3) for the hose connector (7), said receiving means (3) having a first end (3a) and a second end (3b), wherein the receiving means (3) encompasses the hose connector (7) in a form-fitting manner in the circumferential direction in such a manner that the nut (1) and the hose connector (7) are rotatable in relation to one another in the circumferential direction; and
      wherein the nut (1) further comprises anti-rotation protection (4) that is transferable from an open position, in which the nut (1) and the hose connector (7) are rotatable in relation to one another in the circumferential direction when the nut (1) is arranged on the hose connector (7), into a closed position in which rotating of the nut (1) in the circumferential direction in relation to the hose connector (7) is prevented when the nut (1) is arranged on the hose connector (7);
   ii) said hose connector (7) has a tube socket (9) for fastening of the fluid hose, wherein the outside surface of said hose connector (7) comprises a support surface (10) for said nut (1), wherein the dimensions of the hose connector (7) are matched to the nut (1) such that the hose connector (7) can be encompassed by the nut (1) in a form-fitting manner in the circumferential direction, such that the hose connector (7) and the nut (1) are rotatable in relation to one another in the circumferential direction; and
   iii) said hose connection part (13) comprises a fluid channel (14) having an end (14a) on which is arranged a connecting device (15), said connecting device (15) allowing for a liquid-tight connection to said nut (1), and wherein the hose connection part (13) comprises a structural element (16) configured to transfer the anti-rotation protection (4) of the nut (1) from an open position into a closed position.

2. The combination of claim 1, wherein the nut (1) is configured such that the anti-rotation protection (4), at a certain point of the connecting operation between the nut (1) and the hose connection part (13), is transferred by structural element (16) of the hose connection part (13) from the open position into the closed position when the nut (1) is connected to the hose connection part (13); wherein the point is toward the end of the connecting operation, wherein the nut (1) is configured such that the anti-rotation protection (4) does not interact with the structural element (16) of the hose connection part (13) in order to transfer the anti-rotation protection (4) from the open position into the closed position until the nut (1) is almost completely connected to the hose connection part (13).

3. The combination of claim 1, wherein the anti-rotation protection (4) includes at least one clamping element (5) that is arranged on the inside surface of the nut (1) and that is transferable from an open position, which allows a rotational movement of the nut (1) in the circumferential direction in relation to the hose connector (7) when the nut (1) is arranged on the hose connector (7), into a clamping position in which the at least one clamping element (5), to prevent a rotational movement of the nut (1) in the circumferential direction relative to the hose connector (7), is pressed against the hose connector (7) when the nut (1) is arranged on the hose connector (7), wherein the at least one clamping element (5) is configured to be held in the clamping position by means of a clamping force.

4. The combination of claim 3, wherein
   a) the anti-rotation protection (4) of nut (1) includes between 2 and 12 clamping elements (5) which are spaced apart from one another in the circumferential direction and/or
   b) the connecting device (2) of nut (1) includes an external thread which is connectable in a liquid-tight manner to a corresponding internal thread of the hose connection part (13), wherein the clamping element (5) or the clamping elements (5) project beyond the external thread in the axial direction and/or
   c) the connecting device (2) of nut (1) is arranged on the outside surface of the nut (1) in the region of the first end (3a) of the receiving means (3) and/or the clamping element (5) or the clamping elements (5) are arranged on the inside surface of the nut (1) in the region of the first end (3a) of the receiving means (3) and/or
   d) the receiving means (3) for the hose connector (7) extends over the entire axial extension of the nut (1).

5. The combination of claim 4, wherein said plastics material is an electrically conductive plastics material.

6. The combination of claim 5, wherein said wherein said electrically conductive plastics material has electric resistance according to EN 13617-2 of between 200 and 1000 Ohm.

7. The combination of claim 4, wherein the plastics material is selected from the group consisting of polyamides (PA) and polyetheretherketones (PEEK).

8. The combination of claim 1, wherein said nut (1) consists of plastics material.

9. The combination of claim 1, wherein the nut (1) is configured such that the connection between the nut (1) and the hose connection part (13) can withstand tensile forces (measured according to EM 13483 Appendix K) of at least 2000 N over 2 min.

10. The combination of claim 1, wherein said nut (1) comprises reinforcing elements (6), wherein the reinforcing elements (6) are spaced apart from one another in the circumferential direction and/or are arranged on the inside surface of the nut (1) in the region of the first end (3*a*) of the receiving means (3) and/or are arranged in the region of the connecting device (2).

11. The combination of claim 1, wherein said hose connector comprises a holding device (11) which is configured to prevent an axial movement of the nut (1) relative to the hose connector (7), wherein the holding device (11) includes two holding elements (11*a*, 11*b*) which define the support surface (10) for the nut (1) between them, wherein at least one of the holding elements (11*a*, 11*b*) is a flange or flanges, wherein the flange or the flanges preferably extend continuously in the circumferential direction, and wherein the hose connector (7) is further configured to contact an outside surface of a hose connection part (13) in order to generate electrical through-flow.

12. The combination of claim 1, wherein said hose connector comprises on its outside surface at least one portion (12) which is provided for the purpose of serving the at least one clamping element (5) of the nut (1) at least in part as an abutment, wherein the at least one portion (12), which is provided for the purpose of serving the at least one clamping element (5) of the nut (1) at least in part as an abutment, is arranged in the region of the contact surface (10).

13. The combination of claim 1, wherein the connecting device (15) includes an internal thread which can be connected to a corresponding external thread of the nut (1), wherein the hose connection part (13) comprises a structural element (16).

14. The combination of claim 1, wherein the structural element (16) is arranged and dimensioned such that the anti-rotation protection (4) of the nut (1), at a certain point of the connecting operation between the hose connection part (13) and the nut (1), is transferred as a result of the structural element (16) of the hose connection part (13) from the open position into the closed position when the hose connection part (13) is connected to the nut (1).

15. The combination of claim 14, wherein the structural element (16) is arranged and dimensioned such that the anti-rotation protection (4) of the nut (1) is transferred as a result of the structural element (16) of the hose connection part (13) from the open position into the closed position when the hose connection part (13) is connected to the nut (1), wherein the point lies toward the end of the connecting operation.

16. The combination of claim 14, wherein the structural element (16) is arranged and dimensioned such that the anti-rotation protection (4) of the nut (1) is transferred as a result of the structural element (16) of the hose connection part (13) from the open position into the closed position when the hose connection part (13) is connected to the nut (1), wherein the hose connection part (13) is configured such that the structural element (16) does not interact with the nut (1) in order to transfer the anti-rotation protection (4) from the open position into the closed position until the hose connection part (13) is almost completely connected to the nut (1).

17. The combination of claim 1, wherein
a) the structural element (16) comprises at least one feature selected from the following group of features:
the structural element (16) is ring-shaped and/or circular,
the structural element (16) is arranged in the region of the connecting device (15) of the hose connection part (13), wherein the structural element (16) adjoins the termination of the internal thread;
and/or
b) the structural element (16) is configured to interact with the nut (1), wherein the structural element comprises at least one feature selected from the following group of features:
the structural element (16) is configured to act on at least one clamping element (5) of the nut (1),
the structural element (16) is configured to exert a clamping force on the at least one clamping element (5),
the structural element (16) brings about a reduction in the internal diameter of the hose connection part (13) in such a manner that a clamping force is exerted on the at least one clamping element (5) of the nut (1) when the hose connection part (13) is connected to the nut (1), wherein the structural element (16) is configured to produce direct metal contact with a hose connector (7).

18. The combination of claim 1, wherein said hose connection part is a hose connection part for a fuel hose and/or gas hose.

19. The combination of claim 1, wherein the nut (1) is arranged on the hose connector (7).

* * * * *